(No Model.) 3 Sheets—Sheet 1.

J. R. BARRY.
STEAM TRAP.

No. 315,890. Patented Apr. 14, 1885.

Witnesses:

Inventor:
Job R. Barry
By Connolly Bros.
Attorneys.

(No Model.) 3 Sheets—Sheet 2.

J. R. BARRY.
STEAM TRAP.

No. 315,890. Patented Apr. 14, 1885.

Witnesses:
Will½ Powell
N. L. Collamer

Inventor:
Job R. Barry
By Connolly Bros,
Attorneys.

(No Model.) 3 Sheets—Sheet 3.

J. R. BARRY.
STEAM TRAP.

No. 315,890. Patented Apr. 14, 1885.

UNITED STATES PATENT OFFICE.

JOB R. BARRY, OF PHILADELPHIA, PENNSYLVANIA.

STEAM-TRAP.

SPECIFICATION forming part of Letters Patent No. 315,890, dated April 14, 1885.

Application filed January 13, 1885. (No model.)

*To all whom it may concern:*

Be it known that I, JOB R. BARRY, a citizen of the United States, residing at the city of Philadelphia, in the State of Pennsylvania, have invented certain new and useful Improvements in Steam-Traps; and I do hereby declare the following to be a full, clear, and exact description of the invention, reference being had to the accompanying drawings, which form part of this specification, in which—

Figure 1:
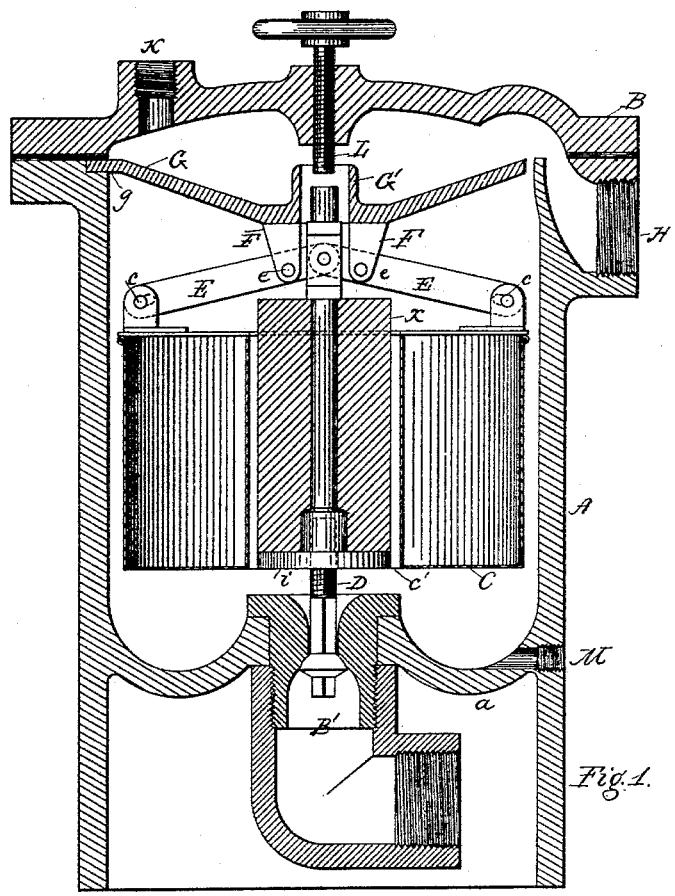
Figure 2:
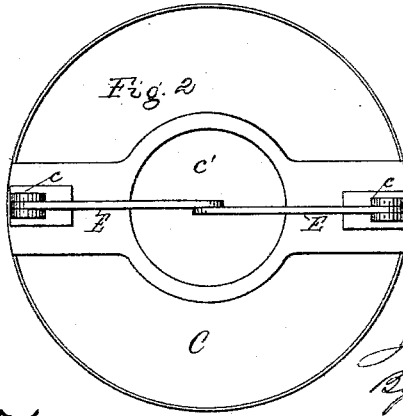
Figure 3:
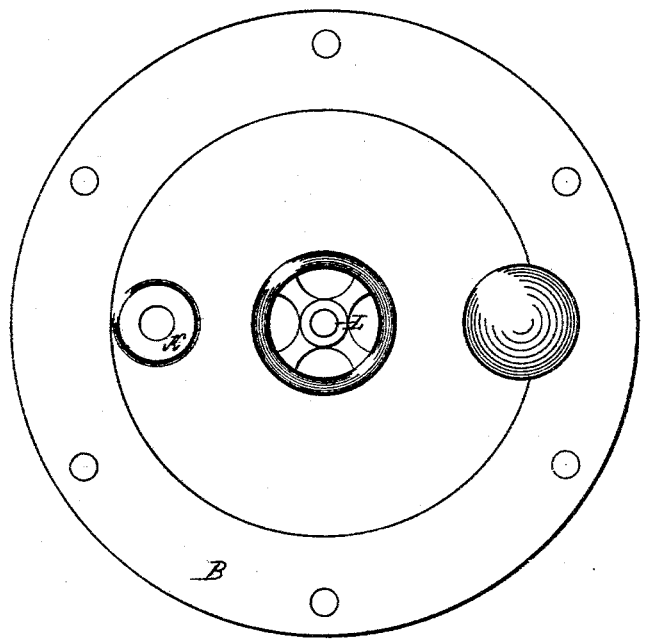
Figure 4:
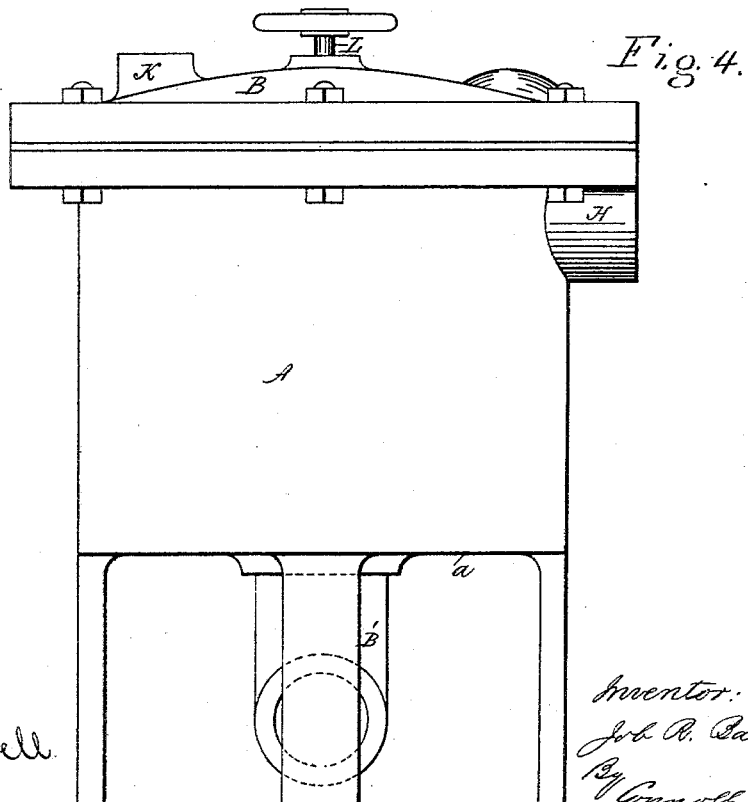
Figure 5:
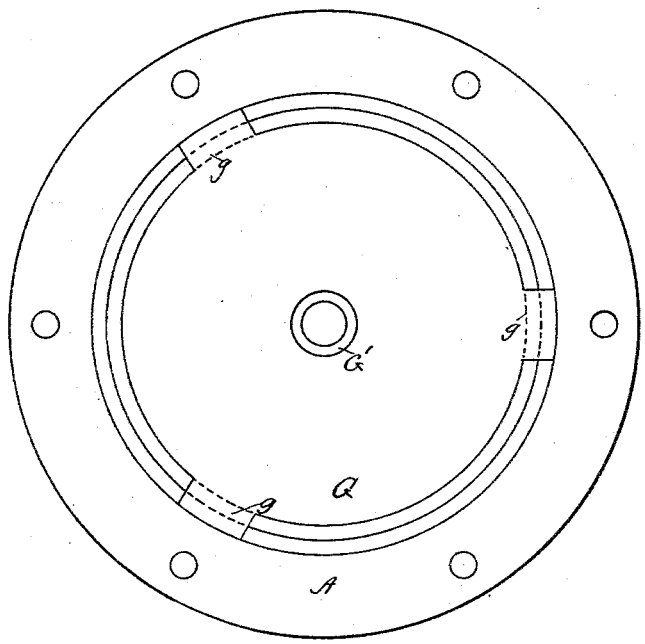

Figure 1 is a vertical section. Fig. 2 is a plan of cup with levers. Fig. 3 is a plan of trap with top removed. Fig. 4 is an elevation, and Fig. 5 a plan.

My invention has for its object to provide an improved construction of steam-trap in which the valve is weighted and balanced, and in which, when the balance is destroyed, the valve opens to permit the escape of water.

My invention consists in the peculiar construction and combination of parts hereinafter fully set forth, having reference particularly, first, to the combination, with the valve-rod, of a cup designed and adapted to hold water, and which, when empty, exactly balances the valve and the weight thereon; second, to the combination, with the body or shell of a steam-trap, of a sediment-collector located in the upper portion of the trap, which collector serves also as a medium of support for the valve and its counterpoise; third, to the combination, with the shell or body of a steam-trap and its valve, of a screw by means of which said valve may be opened to blow through or empty the trap when desired; fourth, to the combination, in a steam-trap, of a weighted or loaded valve and a counterpoise therefor, with levers connecting the latter to the stem or rod of the former; and, fifth, to the construction of the body of the trap with a concave bottom, forming an annular trough around the valve-seat, substantially as hereinafter set forth.

Referring to the accompanying drawings, A represents the shell of the trap, which is a casting, preferably cylindrical in form, having a bottom, $a$, formed integral therewith, and a top, B, which is flange-bolted to the body, as shown. Said body has an inlet-opening, H, below its upper rim, which ascends or trends upwardly, and the bottom B has an outlet, B', in which the valve I has a seat, said valve opening downwardly, as shown.

D is the valve-rod, to which are pivotally connected, near its upper end, the inner ends of levers E E. Said levers have their fulcra at $e\ e$ in lugs F F, which are cast integral with and depend from the under side of a dish-shaped casting, G, which rests upon the upper edge of the body A, the outer ends of said levers being pivotally connected at $c\ c$ to a counterpoise, C, consisting of an annular cup or vessel.

X represents a weight, which is attached to the valve-rod, as shown, said weight having a central opening for the passage of said rod, and resting upon a collar, $i$, on the latter. The weight X is of less radius than the central opening, $c'$, in the annular cup C, so that said weight and cup can move up and down without contact with each other. Said weight is designed to be made of lead, so as to obtain considerable weight in small compass, and the cup C may be of any suitable metal.

The relative proportions of the weight and the cup are such that when the latter is empty it will balance the valve and its weight, and hence there is then no tendency of the valve to open or to close; but when the cup is full of water it will overbalance the valve and its weight, and hold the valve tightly closed against its seat with sufficient force to resist a pressure in the valve of one hundred pounds or more to the square inch.

When in use, as the water rises in the trap outside the cup it gradually accumulates in sufficient quantity to come up to the top of the latter, thus gradually lessening the counterpoising power of the cup and the water therein until, when the level of the water outside of the cup is the same as that inside the latter, an equilibrium is established, and the cup then balances the weight and its valve in the same manner as if the cup and trap were empty of water. Any pressure now in the trap, either of steam or owing to an increase of water, will cause the valve to open, and the water in the trap will then run out until a level is attained at which the pressure will just balance the weight of the water in the cup. Thereafter the water will run out of the trap as fast as it runs in; but in no case will any steam escape at the discharge-valve I, as there is constantly a considerable volume of water in the bottom of the trap when in use.

The dish-shaped casting G has radially-projecting lugs $g\ g\ g$, which afford means for supporting said casting on the body A, the entering water passing downwardly through the segmental openings or passages between said lugs. Said casting has a central hollow boss, G′, in which the upper end of the valve-rod D has vertical play, and into which projects the lower end of the screw L, having a bearing in the center of the top B, as shown. By turning this screw L the valve I may be pushed downwardly away from its seat when it is desired to blow out the trap. The casting G forms an annular trough, in which is collected any sediment or scale that enters with the water through the opening H. The bottom of the body A is also dished, as shown, forming another annular trough, which surrounds the valve-seat, and serves to catch and retain any sediment or solid material which might pass over the collector G.

K is an opening for the connection of an air-valve or petcock, and M a blow-off opening.

The inlet H being below the cover B and separate therefrom, said cover may be removed at any time without disturbing the water-connection.

What I claim as my invention is as follows:

1. In a steam-trap, the combination, with a weighted valve, I, having a rod, D, of a counterbalancing-cup, C, which, when empty, balances said valve and its weight, substantially as shown and described.

2. In a steam-trap, the combination, with the valve I, having a rod or stem, D, of weight X, secured on said rod, and an annular cup, C, connected to the latter by means of levers E E, said cup when empty balancing the valve and weight, substantially as shown and described.

3. In a steam-trap, the combination, with the valve, of a counterpoise which controls the opening and closing of said valve, the same consisting of a cup which, when empty, balances the valve, as set forth, and which, when filled with water, tends to keep said valve closed, the valve opening under pressure when water in the cup is counterbalanced by water outside of the same, substantially as set forth and shown.

4. In a steam-trap, the valve shell or body A, having a central opening in its bottom for a valve, said bottom being concave, and forming an annular trough around the valve-seat, substantially as shown and described.

5. In a steam-trap, the combination, with the valve-rod D, of counterpoise C, levers E E, and support G, having lugs F F for sustaining said levers, substantially as shown and described.

6. In a steam-trap, the combination, with the body A, of the dish-shaped device G, forming a sediment-collector, said collector being located in the upper portion of the trap and above the valve, substantially as shown and described.

7. In a steam-trap, the combination, with a valve, I, having a seat in the bottom or one end of the trap, of the screw L, having its bearings in the top or other end of the trap, and aligned with the rod of said valve, substantially as shown and described.

In testimony that I claim the foregoing I have hereunto set my hand this 12th day of January, 1885.

JOB R. BARRY.

Witnesses:
ISAIAH MATLACK,
M. D. CONNOLLY.